Figure 1:
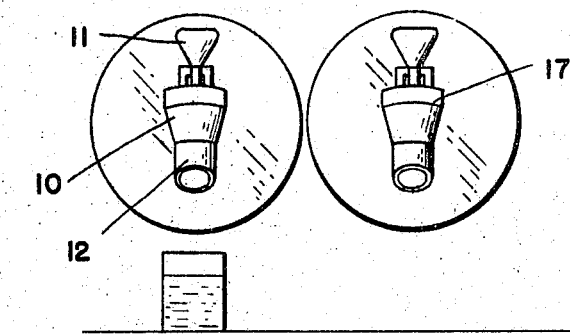

Aug. 2, 1966    F. WELTY ETAL    3,263,864
APPARATUS FOR SUPPLYING CARBONATED WATER TO SOFT DRINK BARS
Original Filed Feb. 6, 1961    2 Sheets-Sheet 1

INVENTOR
FRANK WELTY
RAYMOND D. WELTY
BY Francis J. Klempay
ATTORNEY

INVENTOR
FRANK WELTY
RAYMOND D. WELTY

United States Patent Office 3,263,864
Patented August 2, 1966

3,263,864
APPARATUS FOR SUPPLYING CARBONATED
WATER TO SOFT DRINK BARS
Frank Welty, 4962 Lockwood Blvd., and Raymond D.
Welty, 4307 Lake Road, both of Youngstown, Ohio
Continuation of application Ser. No. 87,164, Feb. 6, 1961.
This application Sept. 15, 1965, Ser. No. 487,417
5 Claims. (Cl. 222—129)

This application is a continuation of application Serial No. 87,164, filed February 6, 1961, now abandoned.

The invention relates to the art of preparing and dispensing soft drinks, and more particularly to improved and simplified apparatus for supplying carbonated water for the preparation of carbonated soft drinks at dispensing bars and the like.

At dispensing locations where a fairly large volume of business in the sale of carbonated beverages is normally done it is now common practice to make the carbonated water required directly on the premises, making use of the available drinking water supply, a carbonator, usually electrically operated, for dispersing a predetermined proportion of carbon dioxide gas throughout the plain water, and refrigerating apparatus. The carbonated and cooled water is conducted to a mixing valve which is also conveniently the dispensing faucet wherein the chilled carbonated water is mixed, in predetermined proportion, with a flavoring syrup upon the mixed drinks being discharged into the consumer's glass. The syrup is conveniently stored in a pressure vessel also kept under refrigeration, with the supply of syrup being replenished from time-to-time from suitable large shipping containers. In this manner a substantially unlimited quantity of individual drinks is always on tap, and substantial economies in the preparation and dispensing of the drinks are effected.

Many soft drinks, such as the cola drinks, for example, require a mixing water having a high degree of carbonation to satisfy the preference of a large majority of the consumers while other drinks such as highly flavored fruit punches, for example, can only be properly prepared with low carbonated water. Thus, a complete soft drink bar requires, in addition to an adequate supply of chilled plain water, a supply of highly carbonated water as well as a supply of low carbonated water. Heretofore the furnishing of this dual supply of carbonated water has presented substantial problems since, on the one hand, the addition of a second carbonating machine with its attendant controls substantially raises the cost of the complete installation while, on the other hand, the attempts heretofore made to simply mix the highly carbonated water with plain water to obtain a supply of low carbonated water has resulted in very erratic results.

It is accordingly the primary object of this invention to provide improved apparatus for use in a soda bar having a unitary source of carbonated water for injecting a controlled amount of carbon dioxide gas into a flowing stream of plain water to thus provide practical and dependable multiple carbonated water sources. A further object of the invention is the provision of apparatus for accomplishing the object stated immediately above which is very simple in concept and construction and which adds little to the overall cost of the complete bar installation.

In accordance with the principles of our invention the controlled quantity of carbonating gas which is added to the flowing stream of plain water to provide a source of low carbonated water as explained above may be derived either from a controlled quantity of highly carbonated water or from a controlled quantity of raw carbonating gas, and in either apparatus the operation is such that the degree of low carbonation is uniform and consistent throughout the whole of the dispensing cycle of the mixing valve or faucet to which the supply of this water is connected. It is well recognized that the amount of carbon dioxide gas absorbed in any body of water is dependent on temperature, pressure, and availability of the gas to the body of water. In the arrangements of the present invention the mixing water stored immediately ahead of the mixing and dispensing faucet or faucets is always protected against an abnormal supply of gas which would tend to produce, in the stored body of water, a degree of carbonation beyond the low value for which the apparatus is set. Accordingly, our apparatus, in either of its embodiments, is dependable in operation regardless of variations in temperature and pressure normally encountered in systems of the general kind involved.

The above and other objects and advantages of the invention will become apparent upon consideration of the following specification and the accompanying drawing wherein there is disclosed certain preferred embodiments of the invention.

Figure 2:
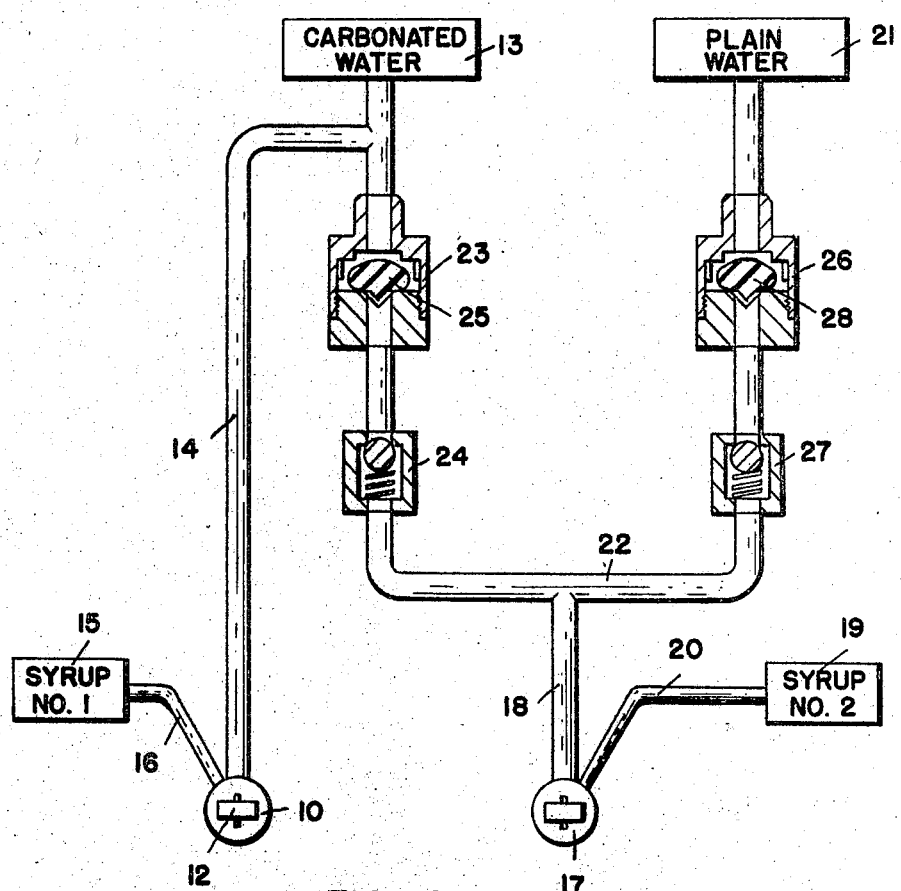
Figure 3:
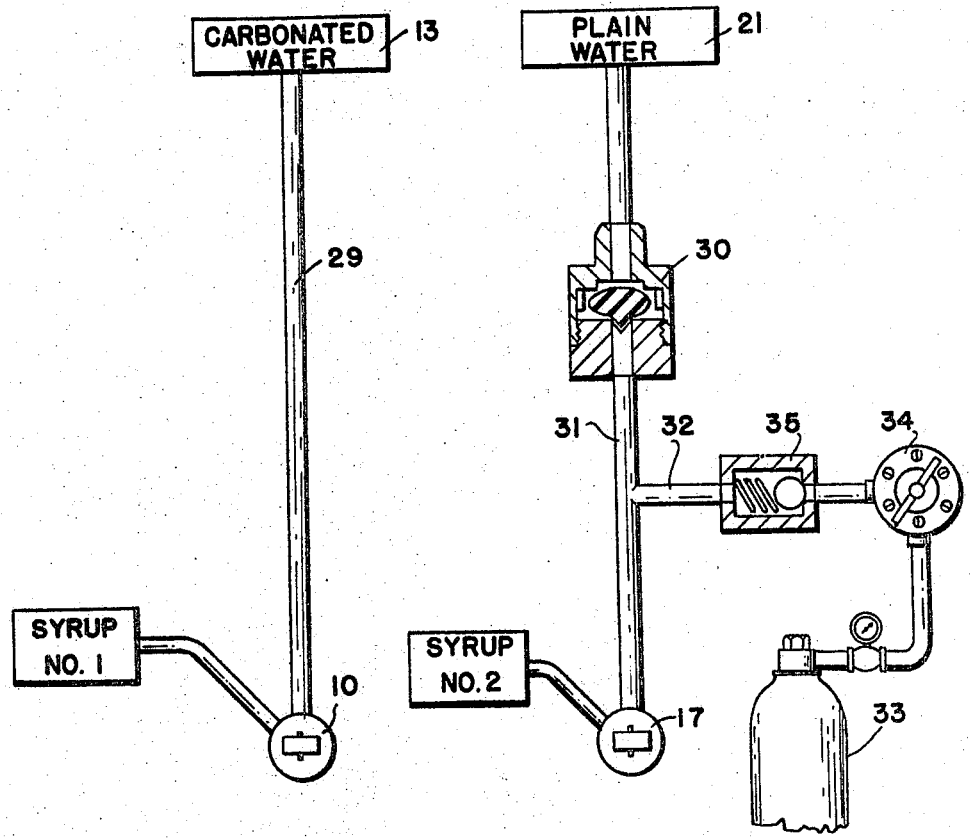

In the drawing:

FIGURE 1 is a fragmentary view of the face of a soft drink dispensing cabinet, showing schematically two mixing and dispensing faucets;

FIGURE 2 is a schematic showing of apparatus which may be used to furnish high carbonated and low carbonated water, respectively, to the mixing and dispensing faucets of FIGURE 1, the apparatus utilizing the preferred method of our invention; and FIGURE 3 is a schematic showing of modified apparatus utilizing an alternate embodiment of our method for furnishing low carbonated water to a soft drink bar.

Referring first to FIGURES 1 and 2, reference numeral 10 designates a combined mixing valve and dispensing faucet of the kind having an operating handle 11 and a dispensing nozzle 12. Carbonated water may be furnished the valve 10 from a suitable source 13 through a conduit 14, and the flavoring syrup is furnished to the same valve from a suitable source 15 through conduit 16. As explained above, source 13 may comprise a carbonating machine in which a volume of water is agitated and foamesced with carbon dioxide gas under pressure, and also preferably under refrigeration, to produce an outflow of highly carbonated water. We shall assume that the valve 10 is for the purpose of dispensing mixed drinks of the kind in which a high or fairly high degree of carbonation is desired.

Reference numeral 17 designates a combined mixing valve and dispensing faucet identical in all respects to the valve 10 and arranged to be supplied with carbonated water through conduit 18 and with syrup from the suitable source 19 through conduit 20. To supply the carbonated water to the conduit 18 we provide a source 21 of plain water which preferably comprises a refrigerated coil or tank, from which water is supplied to a header 22 which also receives carbonated water from the source 13. Interconnecting the source 13 and the header 22 is a flow control valve 23 and a check valve 24. Valve 23 is of known construction in which a yieldable washer 25 is adapted to impinge on a suitable seat in the direction of fluid flow to maintain substantially constant the rate of discharge regardless of variations in the pressure of the fluid entering the valve. Check valve 24 is oriented, as shown, to allow for the flow of water from the source 13 to the header 22 while preventing flow in the opposite direction.

Interposed in series between the plain water source 21 and the header 22 is a second flow control valve 26 and a check valve 27. Valve 26 is similar in all respects to the valve 23 except that its deformable washer 28 may have a different durometer value so that the rate of the plain water is more than the rate of discharge of the carbonated water. In a representative installation for very low carbonation the valve 23 may be chosen to give .14 gallon per minute while the valve 26 is chosen to pass .9 gallon per minute, for example. Check valve 27, like valve 24, is so oriented as to permit the inflow of plain water to header 22 while preventing the reverse flow.

The system comprised of the two sources 13 and 21, the valves 23 and 26 and the mixing header 22 which discharges through conduit 18, may be considered as means for conducting a flow of plain water at a predetermined rate to the mixing valve 17 into which flow is injected carbonating gas at a controlled rate as is contained in the highly carbonated water which is passed by the valve 23 at a controlled rate. The purpose of the check valves 24 and 27 is, of course, to prevent any unbalance in the pre-set proportion since it should be obvious that if, for example, the pressure at 13 should rise appreciably higher than the pressure at 21 that carbonated water will be fed back into the plain water lines which will have the effect of increasing the degree of carbonation in the conduit 18 when the valve 17 is next opened. It should further be observed that no matter how long the valve 17 remains closed between servings, for example, the amount of gas entrapped in the liquid in the conduits 18 and 22 remains the same so that when the valve 17 is next opened there is no out-rush of gas to cause splashing or to otherwise interfere with the normal functioning of the valve 17. In actual practice the total volume of the passages between the valve 17 and the sources 13 and 21 is quite small so that these passages need not be refrigerated.

In the embodiment of the invention shown in FIGURE 3, we again utilize sources 13 and 21 of refrigerated carbonated and plain water, respectively, and again, source 13 is connected to the combined mixing and dispensing valve 10 for handling drinks requiring a normal or high degree of carbonation. As shown in FIGURE 3, source 13 is connected to valve 10 through conduit 29. In this embodiment plain water from source 21 is conveyed to the combined mixing and dispensing valve 17 through a flow control valve 30, and again, the valve 17 is marked and utilized for mixing and dispensing drinks requiring a low degree of carbonation. A conduit 31 interconnects the outlet of valve 30 with the water inlet of mixing valve 17, and communicating with the conduit 31 is a conduit 32 through which is supplied carbon dioxide gas from a cylinder 33. Cylinder 33 is the conventional shipping container for liquified carbon dioxide gas and, in our installation, may be the same source of gas as is used for the carbonator at the source 13, as explained above. Interposed between the cylinder 33 and the conduit 32 is a regulator 34 and a check valve 35, and it should be noted that the check valve 35 is so oriented as to permit the entry of gas into the conduit 32 while preventing the flow of liquid from this conduit into the regulator 34.

In most applications of practical use the flow control valve 30 is selected or set to deliver into the conduit 31 about one gallon of plain water per minute. The size of the conduit 31 is so chosen in relation to the passages in the valve 17 that without the application of any gas pressure very little pressure would exist in this conduit 21. The regulator is normally set to allow the inflow of gas under about 24 pounds per square inch pressure. With these parameters and at the normal temperature of the water issuing from valve 30 the water picks up only so much gas, and the resultant product is found to be consistently at the degree of carbonation desired at the valve 17. Normally the pressure at the source 21 is substantially higher than the pressure at the regulator 34 so that upon the valve 17 being closed and the resultant build up of pressure in conduit 31 above the setting of regulator 34 and up to the value of source 21 the check valve 35 will be closed and the body of water immediately ahead of the valve 17 will remain at its initialed degree of carbonation.

It should now be apparent that we have provided improved and simplified methods and apparatus for supplying beverage mixing water having a low controlled degree of carbonation which accomplishes the objects initially set out. Inasmuch as beverage dispensing bars of the kind at which the drinks are mixed invariably have a source of normally carbonated water and/or a tank of compressed $CO_2$ gas, it is relatively a simple and inexpensive matter, as taught by this invention, to provide also for a supply of low carbonated water. The additional apparatus required is merely a few small valves and interconnecting conduit. Of practical importance also in the systems proposed is the characteristic that properly carbonated water is always instantly available at the mixing and dispensing faucets regardless of variations in time intervals between successive actuations of the faucets. The resultant mixed products are uniform and there is no waste of carbon dioxide or flavoring syrup.

Having thus described our invention what we claim as new and desire to secure by Letters Patent is:

1. Apparatus for supplying low carbonated water to a mixing and dispensing faucet of a soft drink bar and the like comprising a source of plain water under pressure, conduit means including a flow control device interconnecting said source with said faucet, second conduit means including a valve for discharging carbonating gas into the first mentioned conduit means, a source of carbonating gas for said second conduit means, and means to control the proportion of gas discharged into the water contained in said first mentioned conduit means, said flow control device being of the kind which passes a predetermined quantity of liquid per unit of time regardless of the incoming pressure of the liquid.

2. Apparatus according to claim 1 further characterized in that said source of carbonating gas and said means to control comprises a pressurized cylinder of said gas having outlet means including a pressure regulator for supplying gas to said second mentioned conduit means.

3. Apparatus according to claim 1 further characterized in that said source of carbonating gas and said means to control comprise a source of highly carbonated water and a third conduit means including a second flow control device of the kind recited for discharging highly carbonated water from the last mentioned source into said second conduit means.

4. A soft drink bar installation having a pair of mixing and dispensing faucets for preparing and dispensing two different kinds of beverage, sources of carbonated and plain water both under pressure, a first conduit interconnecting the carbonated water source with the water inlet of one of said faucets, a second conduit connected with the water inlet of the other of said faucets, a first conduit means including a first flow control device and a first valve in series interconnecting said carbonated water source with said second conduit, and a second conduit means including a second flow control device and a second valve in series interconnecting said plain water source with said second conduit.

5. Apparatus for supplying low carbonated water to a mixing and dispensing faucet of a soft drink bar and the like comprising sources of highly carbonated and plain water both under pressure, a first conduit means including a first flow control device and a first valve in series interconnecting one of said sources with the water inlet of said faucet, and a second conduit means including a second flow control device and a second valve in series interconnecting the other of said sources with the said water inlet of said faucet, each of said flow control devices being of the kind which passes a predetermined quantity of liquid per unit of time regardless of the incoming pressure of the liquid.

References Cited by the Examiner

UNITED STATES PATENTS 1,246,498  11/1917  Toussaint et al.
2,612,304   9/1952  Nissen _____ 222—129.4 X LOUIS J. DEMBO, *Primary Examiner.*

C. R. CARTER, *Assistant Examiner.*